June 11, 1968  E. R. KRETZMER  3,388,330
PARTIAL RESPONSE MULTILEVEL DATA SYSTEM
Filed March 19, 1965  7 Sheets-Sheet 1

INVENTOR
E. R. KRETZMER
BY
ATTORNEY

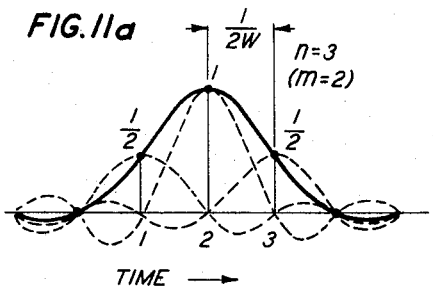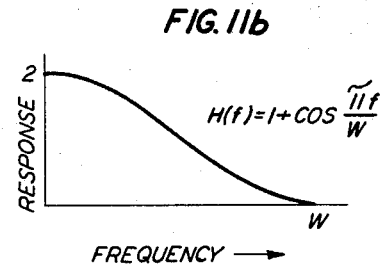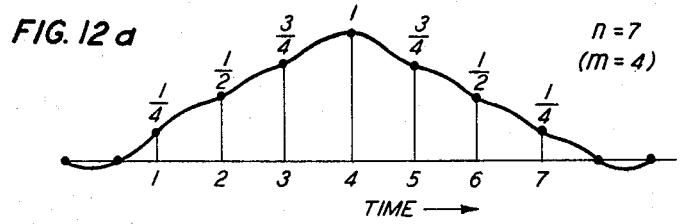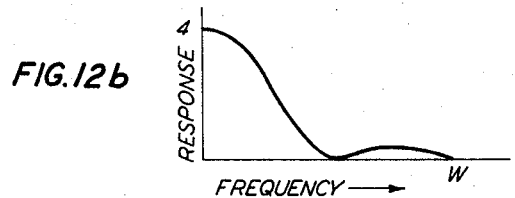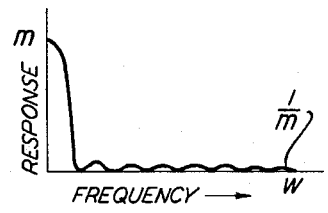

June 11, 1968   E. R. KRETZMER   3,388,330
PARTIAL RESPONSE MULTILEVEL DATA SYSTEM
Filed March 19, 1965   7 Sheets-Sheet 5

June 11, 1968  E. R. KRETZMER  3,388,330
PARTIAL RESPONSE MULTILEVEL DATA SYSTEM
Filed March 19, 1965  7 Sheets-Sheet 6

June 11, 1968   E. R. KRETZMER   3,388,330
PARTIAL RESPONSE MULTILEVEL DATA SYSTEM
Filed March 19, 1965   7 Sheets-Sheet 7

United States Patent Office 3,388,330
Patented June 11, 1968

1

3,388,330
PARTIAL RESPONSE MULTILEVEL
DATA SYSTEM
Ernest R. Kretzmer, Holmdel, N.J., assignor to Bell Telephone Laboratories, Incorporated, New York, N.Y., a corporation of New York
Filed Mar. 19, 1965, Ser. No. 441,197
16 Claims. (Cl. 325—42)

ABSTRACT OF THE DISCLOSURE

Band-limited transmission facilities, when excited by binary data signals at rates exceeding the facility bandwidth, disperse the response to individual inputs over more than one signaling interval, i.e., the response to an individual input is only partial with respect to the duration of each signaling interval. The total dispersed response to an indiivdual input signal can be analyzed as the superposition of two or more spaced ideal (sin $x$)/$x$ impulse responses and classified according to the pattern of the superpositions. Each class of superposition can further be related to the spectral shaping of the transmission facility. Controlled spectral shaping by means of selected low- or bandpass filters concentrates spectral energy at the low-frequency or center-frequency regions of the facility transmission band and permits smooth, gradual roll-offs at the high-frequency region. Although the resultant transmitted signals become multilevel for random binary input data, precoding of the input data before facility excitation eliminates error propagation at signaling rates equal to twice the facility bandwidth and imparts binary significance to the several levels of the transmitted signal at individual sampling instants.

This invention relates to the transmision of high-speed data over channels of limited bandwidth. Specifically, binary digital data is transmitted at rates exceeding that at which intersymbol interference occurs in the absence of channel equalization.

It is well known from the theoretical work of H. Nyquist in the field of telegraph transmission that the maximum symbol rate attainable over a channel of limited bandwidth is twice the bandwidth of that channel. This maximum rate is attainable only if the channel has a flat frequency response, and linear phase delay throughout the frequency band of interest and no transmission outside that band. If such a channel were physically realizable, binary transmission would be possible at the maximum rate without intersymbol interference. Approaches to the ideal channel characteristic are possible through channel equalization. Complex filters are required in this approach and, even if carried out, rather precise sampling is necessary. For the ideal channel the impulse response is the familiar (sin $x$)/$x$ shape.

Because it is impossible as a practical matter to construct a filter which cuts off entirely at any given frequency, channel shaping is often adopted. The full-cosine roll-off characteristic, as an example, is used to provide reasonable tolerance to deviations in rate and sampling time at the expense of bandwidth. This approach is known as spectral shaping, the object of which is to escape the consequences of the sharp discontinuity of the ideal spectrum at the band edge. A principal consequence of this discontinuity is intersymbol interference due to overlapping of the impulse responses of successive symbols. The conventional remedy is to reduce the signaling speed or to increase the bandwidth.

Conventional digital transmission systems include an analog channel, for example, a voice-band telephone connection, which is operated in a "memoryless" fashion.

2

The decision made at the receiver is based on the state of a single sample. To avoid intersymbol interference a suitable choice of symbol spacing is therefore necessary. Another class of digital transmission systems permits the transmission channel to have memory and corrects for the resultant intersymbol interference by modifying the decision criteria. Ocean telegraphy provides an example of such modified criteria in the work of A. A. Clokey described in the Bell System Technical Journal, vol. 6, at page 402, published in July 1927. Clokey provided a feedback winding on the receiving relay to adjust the operating threshold in accordance with past signal values. In effect he permitted the channel to have a memory and thus changed a binary signal into a three-level signal with extreme levels having the usual binary significance and the center level representing the complement of the prior signal.

What Clokey did with a special receiving relay at the receiver can also be done by controlling the channel characteristic shaping. A binary signal can be transmitted at twice the usual Nyquist rate through a channel such that the received spectral density is that of a quarter-period cosine function with cut-off frequency at half the signal rate. The channel will response by only one-half amplitude from one sample to the next. Thus, samples will be found at three levels instead of two. These levels have then the same binary interpretation as Clokey's three-level signals.

Accordingly, it is an object of this invention to achieve full utilization of practical transmission channels without imposing severe equalization requirements.

It is another object of this invention to generate a multilevel signal having unambiguous binary interpretation in a simple manner.

It is a further object of this invention to relax the filtering requirements for maximum band utilization of band-limited transmission channels.

According to this invention, I introduce the "partial-response" concept to describe binary digital transmission systems in which channel response to a single symbol extends over more than one symbol interval. Each received signal sample includes contributions in a known pattern from several input symbols and may occupy one of several levels. This contrasts with the usual practice of equalizing a transmission channel so as to make it essentially memoryless.

The impulse response of an ideal Nyquist channel is of the form (sin $x$)/$x$ per symbol. The envelope of the waveform (sin $x$)/$x$ decays at a slow rate in inverse linear fashion with time. Hence, precise sampling times must be maintained. This result obtains because of the uniform spectral density throughout the transmission band and the abrupt discontinuity at cut-off.

The spectral energy can be moved toward the origin by superposition or overlapping of impulse responses. Let each symbol evoke a fixed plurality of (sin $x$)/$x$ functions and superpose these functions at intervals related to the desired signaling rate. The resulting spread-out responses reduce the high-end spectral density and produce a multilevel signal. The received signal is then sampled on all levels at the desired signaling interval. Logical rules for interpreting these multiple levels in binary fashion at the receiver are devised.

Practical transmission channels are often shaped to exhibit a full-cosine roll-off spectrum instead of the ideal rectangular spectrum. In such a channel, binary transmission at the rate of one bit per cycle of bandwidth is conventionally attained. The response time for each symbol requires a full signaling interval. Doubling the transmission rate causes overlapping response which precludes independent binary interpretation of the received wave.

However, the superpositions according to this invention produce multiple levels which can be sampled and interpreted in each signaling interval by sampling the response in parts and comparing the present level either directly with the contributions from previous level samples or with the weighted contributions from previous level samples, depending on the type of superposition. By contribution is meant the binary form (1 or 0) determined from samples prior to the present sample.

Several classes of superposition are possible according to this invention. Equal amplitude superpositions of $(\sin x)/x$ responses yield a generally flat-topped envelope for each symbol and one more sampling level than the number of superpositions.

Symmetrically weighted superpositions yielding a pyramidal envelope produce a more concentrated spectral density achieved by a simpler filter, but require sampling at a greater number of levels.

Unsymmetrically weighted superpositions, including negative components, yield a more complex envelope but superior noise performance.

Other superpositions, including positive and negative components, yield symmetrical spectral distributions free of direct-current components.

An analysis of the superpositions shows that the resultant spectral shaping can be obtained, at least for cases of practical interest, by the use of simple filters. The required spectral shaping is obtainable in a number of different ways. Lumped constant filters employing resistors, inductors and capacitors in the lattice formation for balanced transmission lines and in the ladder formation for unbalanced transmission lines can be designed to approximate any desired frequency response characteristic. Equivalent delay lines, either in analog or digital form, can also be used. Combinations of linear filters and delay lines likewise serve for this purpose.

Binary detection of the multilevel received signals of any of the suggested superpositions is possible with the combination of an amplitude comparator, shift register and a linear adder. Weighting networks are required for the weighted superpositions only.

Detection is also possible using separate fixed slicing comparators between adjacent levels. However, logic circuits tailored to each class of superposition are then required.

A feature of this invention is that binary signaling at the theoretical maximum rate is made possible by interpreting the received signal on more than two levels and on the basis of partial, rather than complete, channel responses.

Another feature of this invention is that the required channel shaping can be obtained by the use of simple filters rather than equalizing the channel to the ideal rectangular frequency response.

An advantage of this invention in one of its aspects is that the compression of the spectral density of the transmission channel toward the lower frequencies greatly reduces cross-modulation between channels of a frequency-division multiplex system.

An advantage of this invention in another of its aspects is that the direct-current component can be eliminated from the baseband transmitted signal.

Further objects, features and advantages of this invention will be appreciated from a consideration of the following detailed description and the drawing in which:

FIGS. 11a and 11b are respectively the time and frequency domain responses of symmetrically weighted impulse superpositions extending over three symbol intervals;

FIGS. 12a and 12b are respectively the time and frequency domain responses of symmetrically weighted impulse superpositions extending over seven symbol intervals;

FIGS. 13a and 13b are respectively the time and frequency domain responses of symmetrically weighted impulse superpositions extending over $n$ symbol interval;

Figure 23A:
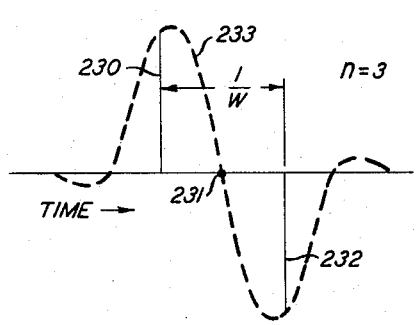
Figure 23B:
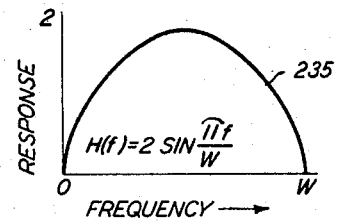
Figure 24A:
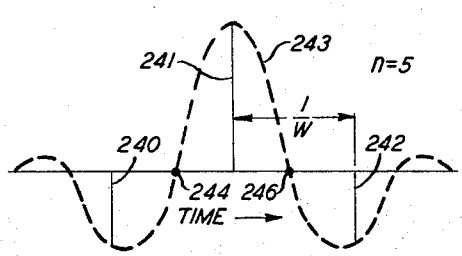
Figure 24B:
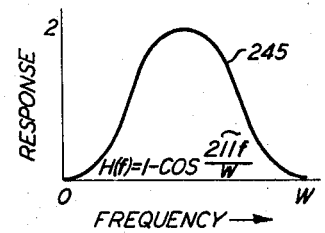

FIGS. 23a and 23b are respectively the time and frequency domain responses of positive and negative superpositions extending over three symbol intervals and yielding a symmetrical spectral response free of direct-current components; and FIGS. 24a and 24b are respectively the time and frequency domain responses of positive and negative superpositions extending over five symbol intervals and yielding a symmetrical spectral response free of direct-current components.

Figure 19:
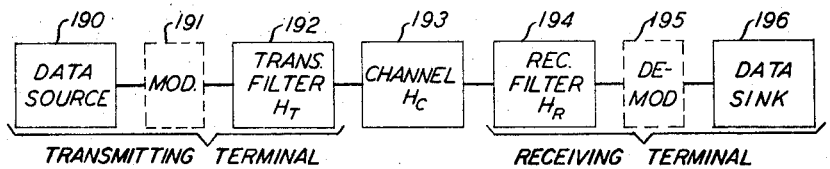
FIG. 19 is a generalized block diagram of a data transmission system.

FIG. 19 is a general block diagram of a data transmission system. In such a system a binary data source 190 generates a message consisting of a sequence of marking bits called "1's" and spacing bits called "0's." A "1" may be represented by a positive voltage level and a "0" by the ground level. In the alternative 1's may be positive voltage levels and 0's negative voltage levels. The data signal may be transmitted at baseband through a transmission channel 193 which then must be generally capable of transmitting a direct-current component. Where the channel will not transmit direct-current, means, such as modulator 191 (shown in a broken line box), are required to translate the baseband signal to the passband of channel 193. Amplitude, frequency or phase modulation may be used. At the distant end of the transmission channel the data, if transmitted at baseband, is delivered to data sink 196. If modulator 191 were used at the transmitting end, then demodulator 195 (shown in a broken line box) must be used at the receiving end.

Two classes of superposition have been devised which do not require transmission of a direct-current component at baseband.

The 1's and 0's of the data signal are typically square pulses and encompass a very wide frequency range. For ideal transmission of the signal infinite bandwidth would be required for the transmission channel. However, all practical channels are of limited bandwidth and therefore distortion of the square pulse shape is inevitable. A square pulse transmitted through a band-limited channel will generally be rounded in shape and spread out in time. Conventional channel use adjusts the spacing between pulses to prevent intersymbol interference at the receiver and to permit independent detection of each signal bit.

It is well known from the work of H. Nyquist and others that a transmission channel of bandwidth W cycles per second can convey 2W completely independent samples per second, provided that the frequency function is completely flat throughout the band with absolute cut-off at the band edges and that the phase function is linear throughout the band. Further, the input signal must consist of impulses. In other words, the spectral density of the detected signal at the receiver must be rectangular, i.e., uniformly distributed.

Practical channels do not approach this ideal transfer function. The actual transfer function $H_c$ of the channel can be compensated by filters in series with the channel. In practice channel equalization is attempted by adding transmitting and receiving filters, such as filters 192 and 194, to the channel. Such filters also exclude white noise outside the desired transmission band from interfering with the signal, and can take into account the fact that the intelligence signal may consist of square pulses rather than impulses.

The complete transfer function as seen at the receiver is the product of the individual transfer functions, $H_T$ of the transmitting filter 192, $H_c$ of the channel 193 and $H_R$ of the receiving filter 194.

Because of the severe requirement for the ideal transfer function of absolute cut-off at the band edge, full-cosine roll-off spectral shaping is often used. This doubles the bandwidth (or halves the maximum transmission rate) required, but is a more easily attainable shaping.

The response of the ideal band-limited channel with a rectangular frequency spectrum to an impulse is of the form $(\sin x)/x$. However, as stated above, full-raised-cosine roll-off spectral shaping is usually used with a resulting reduction in signaling rate. The maximum attainable signaling rate without intersymbol interference then becomes W bits per second in a channel of width W cycles per second. The rectangular signals can be converted substantially to impulses by clocking with sharp pulses or can be compensated for in the spectral shaping.

Figure 1A:
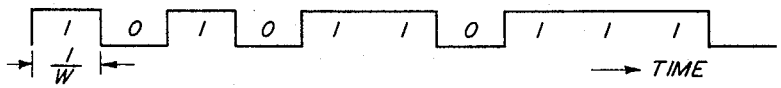
FIGS. 1a and 1b illustrate respectively from the prior art a representative binary non-return-to-zero signal train and the corresponding received signal wave in which the symbol spacing is sufficient to allow complete channel response in each symbol interval.
Figure 1B:
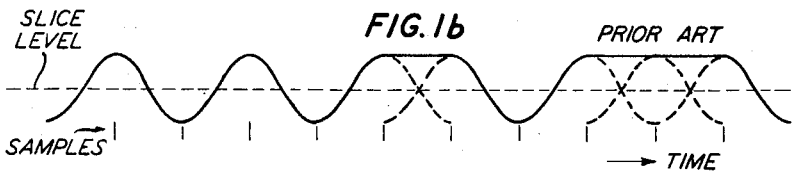

FIG. 1a illustrates a representative non-return-to-zero binary signal wave of a type known in the prior art applied to a channel of bandwidth W, assumed to have raised cosine shaping. The signaling rate is W bits per second. Full channel response to each bit requires $1/W$ seconds for completion. FIG. 1b illustrates the received signal wave in the absence of noise. Each bit requires a full symbol interval between 0 and 1 levels. The dashed-line curves represent the received wave if it were alternately 1 and 0. A single slice level provides unambiguous detection with samples taken (as indicated by the tick marks at the bottom) at the positive and negative peaks of the signal wave. There is no intersymbol interference.

Figure 2A:
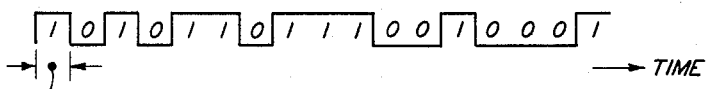
FIGS. 2a, 2b and 2c illustrate respectively from the prior art a representative binary non-return-to-zero signal train and the corresponding received signal wave in which the symbol spacing is sufficient to allow only a partial response in each symbol interval with two-level and three-level sampling.
Figure 2B:
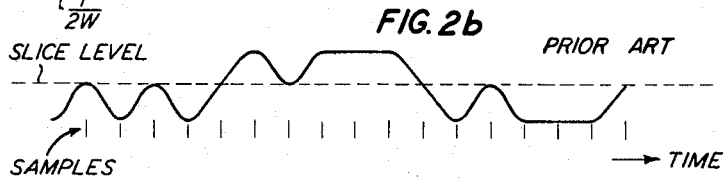

FIG. 2a shows the same binary signal wave applied to the same channel at the signaling rate of 2W bits per second. The bit interval is now $1/2W$ seconds. FIG. 2b shows the received wave. Only half the level change is obtained per bit, since the channel response remains the same. Two bits of the same type in succession are required for full response. Therefore, with a slicing level established midway between signal peaks and samples taken at the peaks the signal is correctly detected only at the major peaks. All minor peaks at the slice level are ambiguous and correct interpretation is impossible on the basis of a single independent sample.

Figure 2C:
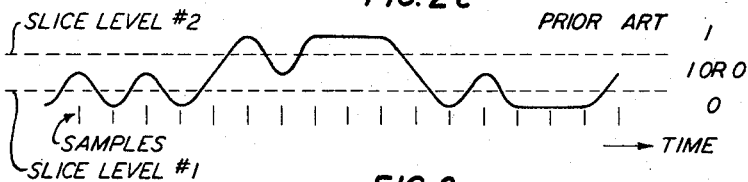

FIG. 2c shows the same received wave as FIG. 2b, but with two slicing levels established. The positive peaks are sampled in the topmost zone and are interpreted as 1's, and negative peaks in the bottom zone are interpreted as 0's. Samples falling in the middle zone are interpreted as 1 or 0, complementary to the preceding sample. Therefore, a detector with memory extending over two bit intervals is required.

Figure 3A:
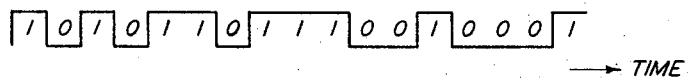
FIGS. 3a, 3b, 3c and 3d illustrate respectively a representative binary non-return-to-zero signal train, a recording of that signal train by modulo-two addition, the corresponding received signal wave adapted for sampling on three levels, and the binary signal train resulting from such sampling.
Figure 3B:
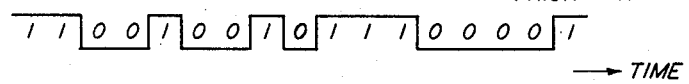
Figure 3C:
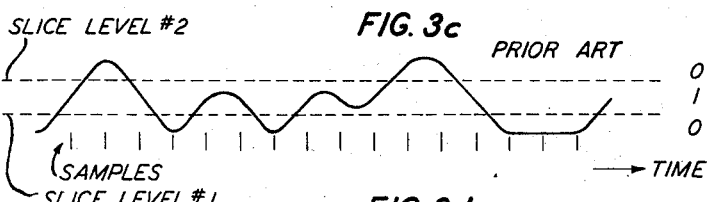
Figure 3D:
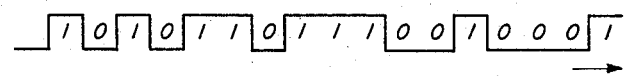

FIG. 3a shows the same received wave as does FIG. 2a. By precoding this wave on a modulo-two sum basis as shown in FIG. 3b the requirement for memory in the receiver is eliminated. Let the wave of FIG. 3a be represented by the sequence $a_1 a_2 a_3 \ldots a_n$, where $a_n$ can be either 1 or 0. Let the wave of FIG. 3b be represented by the sequence $b_1 b_2 b_3 \ldots b_n$, where $b_n$ can be either 1 or 0. Sequence $b_n$ is constructed by taking the modulo-two sum (carries discarded) of the past $b_{n-1}$ bit and the present $a_n$ bit. Sequence $b_n$ is still a binary wave, but now channel memory has been compensated in advance by differential encoding. When sequence $b_n$ is applied to the channel, the three-level wave of FIG. 3c results. The wave of FIG. 3c is equivalent in each bit position to the algebraic sum (carries retained) of the present $b_n$ bit and the previous $b_{n-1}$ bit. Two slice levels are applied to the wave of FIG. 3c as in FIG. 2c, thus dividing it into three zones. The outermost zones are unambiguously 0 and the inner zone is 1. Samples taken at the major peaks in the outer zones of the wave and at transitions in the middle zone have independent binary significance. The signaling rate is effectively 2W bits per second in a channel with bandwidth of W cycles per second. FIG. 3d shows the recovered binary signal wave, which is identical to the transmitted wave of FIG. 3a.

Figure 16:
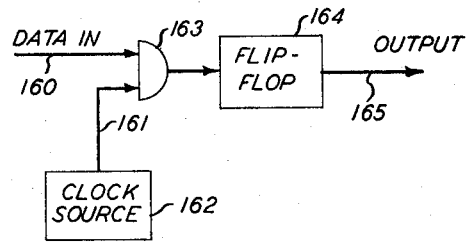
FIG. 16 is a block diagram of a prior art three-level encoder for baseband binary data.

FIG. 16 shows a simple instrumentation for making the modulo-two transformation from the $a_n$ sequence of FIG. 3a to the $b_n$ sequence of FIG. 3b. The incoming $a_n$ sequence on line 160 is combined in coincidence circuit 163 with clock pulses from clock source 162 on line 161 to drive flip-flop 164. The flip-flop is connected for complementing on each 1 data bit. The output on lead 165 is the $b_n$ sequence.

Detection of the binary wave of FIG. 3d from the three-level wave of FIG. 3c is accomplished simply by full-wave rectification, which folds over the bottom level onto the top level or vice versa. This much is known from the prior art.

The analysis of FIGS. 1 through 3 is mainly a restatement of the work of Clokey in the telegraph art. The new description is in terms of channel shaping and digital logic. The examples given are part of a broader concept of data transmission through band-limited channels which I have chosen to call the partial-response concept.

Partial-response transmission significantly increases the binary transmission rate attainable with gradual roll-off, band-limited channels. Compensation for channel intersymbol interference by multilevel decision methods at the receiver permits signaling at the full Nyquist rate—twice the conventional rate for the channel with a full cosine roll-off spectral distribution.

A partial-response system transmits a two-level signal over a channel with memory extending over $n$ binary input symbols, and retrieves the binary sequence on the basis of L significant detectable levels, where L is greater than $n$. Considering only binary inputs, at least five classes of partial-response systems can be defined and characterized. Under the partial-response concept each output symbol contains contributions from $n$ input symbols which can assume any of $2^n$ possible values. The original binary value can be retrieved only by taking into account the past $n-1$ symbols, which have $2^{n-1}$ different combinations.

The partial-response systems of this invention are so constrained, however, that the number of levels does not grow exponentially with $n$, i.e., as $2^n$. Rather the number grows either linearly, designated classes 1 and 4, or as the square (classes 2, 3, and 5). The basic principle common to these classes is that of superposition of impulse responses for each data symbol to be transmitted. Spreading out impulse responses in this way results in a tapered spectral density in the over-all system frequency response.

Figure 4:
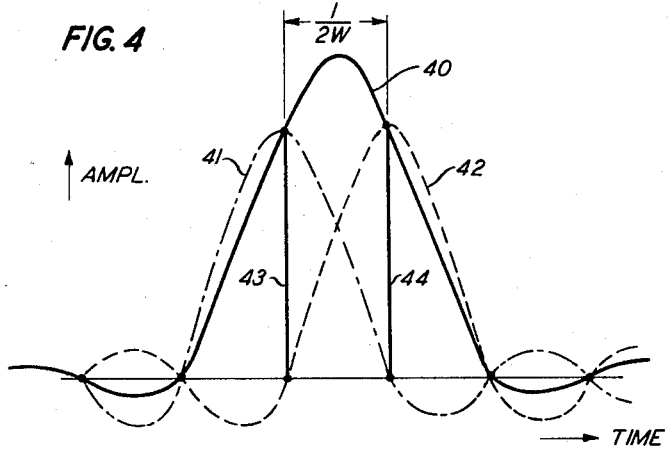
FIG. 4 illustrates the waveform resulting from the equal-amplitude superposition of two $(\sin x)/x$ impulse responses.

The simplest superposition of two identical $(\sin x)/x$ responses both corresponding to the same data symbol is shown in FIG. 4. The initial impulse response 41 (dot-dash curve) corresponding to data impulse 43 is effectively delay by $1/2W$ seconds to the position of impulse 44, which corresponds to a response 42 (dashed curve). Such superposition of responses 41 and 42 corresponds to an over-all response 40 (solid line). Signaling is possible with the new superposed impulses at a rate 2W, twice the channel bandwidth, the data pulses being either present or absent. The resulting waveform assumes one of three possible values at each sampling point. The symbol response is spread over $1/W$ seconds, rather than $1/2W$ seconds to improve channel bandwidth utilization without crowding the high end of the frequency spectrum. Zeros are present at $1/2W$ second intervals beyond the two non-zero values of superposed impulses 43 and 44.

Figure 5:
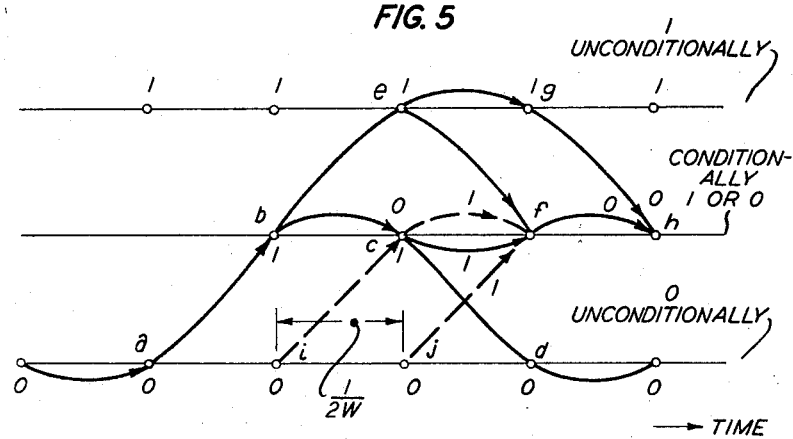
FIG. 5 illustrates the binary interpretation of a three-level received wave resulting from an equal-amplitude superposition of two $(\sin x)/x$ impulse responses.

The resultant three-level wave is capable of binary interpretation as shown in FIG. 5. Three levels are indicated. The base level unconditionally represents the 0 data symbol. Samples are taken as shown by the small circles at intervals $1/2W$ seconds apart during which interval only half the total response to each impulse occurs. Two bits in succession are required for a full response. The top level represents a 1 bit. The response of a 1 bit followed by 0 bits evokes the response *abcd*. Samples taken at *b* and *c* indicate a 1 followed by 0 because a sample taken at the center level represents the complement of the preceding symbol. The response of two 1 bits followed by 0 bits evokes the response *abcf*. Three 1 bits in succession command the response *abegh*. Two 0 bits followed by a 1 bit determine the response *aicf*. Similarly for any other data symbol sequence. A dotting (010101) sequence causes a response which dwells on the center level. FIG. 5 is for explanation and is not intended to show actual waveshapes. All transitions in the real wave are smooth.

Figure 6:
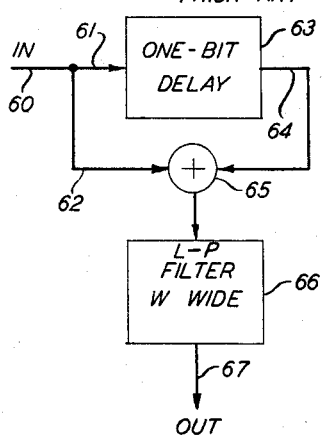
FIG. 6 is a block diagram of a circuit of the prior art for obtaining a three-level response characteristic from a binary data signal.

One possible way to generate a superposition of impulse responses is diagrammed in FIG. 6. Here each signal impulse incident on input lead 60 is applied to a one-bit delay circuit 63 on lead 61 and to a linear adder or combiner on lead 62. The output of the delay circuit 63 on lead 64 is combined in adder 65 with the direct input on lead 62. The adder output is passed through a low-pass filter 66 with a bandwidth of W cycles per second. The net output for a single bit is the wave shown in FIG. 4.

Figure 7:
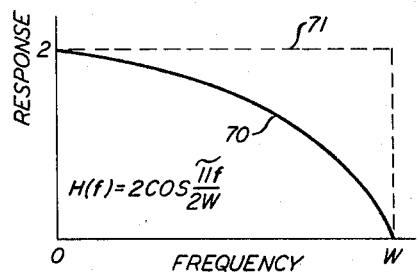
FIG. 7 is the equivalent frequency response characteristic of the circuit of FIG. 6.

The wave in FIG. 4 is equivalent in the frequency domain to quarter-cosine curve 70 in FIG. 7 out to the bandwidth W. Curve 70 is also the transfer function of the circuit of FIG. 6. Therefore, the superposition of FIG. 4 can be effected by shaping the channel to have a quarter-cosine envelope. This can be approximated to any required accuracy by known realizable filtering techniques, as disclosed in standard texts such as E. A. Guillemin's Synthesis of Passive Networks (John Wiley and Sons, Inc., New York, 1957). The ideal Nyquist rectangular spectrum 71 shown by dashed lines in FIG. 7 (and in Guillemin's Fig. 7 on page 589 of the cited work) is, on the other hand, much more difficult to approximate and suffers from the problem of a nonlinear phase characteristic.

Although the three-level response evoked by quarter-cosine channel shaping has only half the distance between levels as the conventional two-level response and hence a degradation of six decibels relative to noise, nevertheless there is at most a three-decibel over-all loss over the two-level response. This is due to the fact that the noise bandwidth of a channel is proportional to the area under the squared transmission curve. The area under the square of curve 70 is only half that under the square of curve 71 and therefore three decibels of the noise disadvantage due to reduced level spacing can be credited to the multilevel system, assuming that the channel shaping is concentrated at the receiver. For optimal shaping distribution among transmitter, channel and receiver, all but 2.1 decibels of the loss are recovered. At the same time, the limiting signaling rate is reached in a practical system.

Figure 8A:
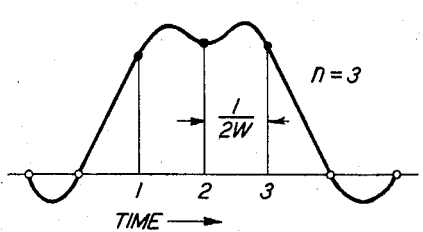
FIGS. 8a and 8b are respectively the time and frequency domain responses of equal-ampltiude impulse superpositions extending over three symbol intervals.
Figure 8B:
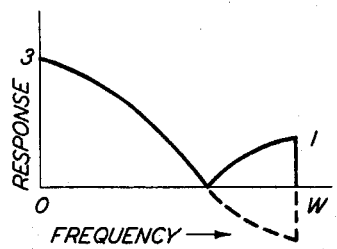

The three-level partial-response application can be extended to the more generalized superposition of $n$ identical $(\sin x)/x$ responses. This results in $n+1$ possible levels per sampling point. FIG. 8a shows the time domain envelope for a triple superposition ($n=3$). The corresponding frequency function is shown in FIG. 8b. A phase reversal occurs about two-thirds of the way up the frequency scale and there is an abrupt discontinuity at the band edge as with the ideal rectangular spectrum. The solid curve is the absolute response characteristic. The broken curve indicates the phase reversals in the response characteristic.

Figure 9A:
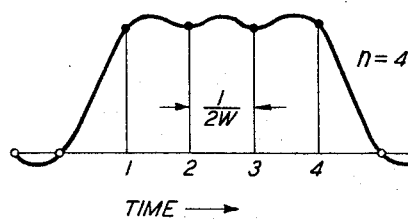
FIGS. 9a and 9b are respectively the time and frequency domain responses of equal-amplitude impulse superpositions extending over four symbol intervals.
Figure 9B:
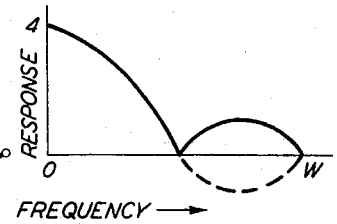
Figure 10A:
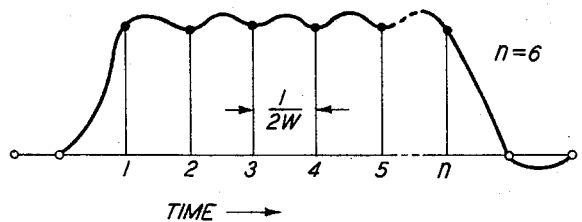
FIGS. 10a and 10b are respectively the time and frequency domain responses of equal-amplitude impulse superpositions extending over six symbol intervals.
Figure 10B:
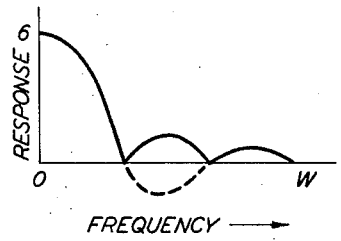

FIGS. 9a and 9b show respectively the wave shape and frequency response for the case of $n=4$, requiring five sampling levels. FIGS. 10a and 10b show respectively the wave shape and frequency response for the case of $n=6$, which requires 7 sampling levels.

The periodic phase reversals in the frequency of all class 1 equal-amplitude superpositions, except for the case of $n=2$, render practical implementation unattractive. Particularly is this so in the case of $n=3$, or $n$ odd in general, because of the sharp discontinuity at the band edge as is the case with the ideal reactangular spectrum.

Another class of impulse superpositions, which I designate class 2, has a generally pyramidal envelope as shown in FIG. 11a. This class consists of weighted, rather than equal-amplitude, superpositions. Unity weight is assigned the center component and side components are weighted by fractions having even-numbered denominators. For the case of $n=3$ shown in FIG. 11a the side components are weighted by one-half. The corresponding frequency spectrum is the familiar full cosine roll-off shown in FIG. 11b.

In order to preserve spectral continuity at the band edge an odd number of side components is necessary. Therefore, the number of superpositions must increase in the order of 3, 7, 11 and so forth.

FIGS. 12a and 12b illustrate respectively the envelope and spectrum for the case of $n=7$. Side components are weighted in fourths. The quantity $m$ for which $1/m$ is the weighting for the smallest component exists. In general, $m=(n+1)/2$. The frequency spectrum is zero at $1/2W$ and beyond W cycles per second.

FIGS. 13a and 13b illustrate respectively the envelope and spectrum for the general class 2 superposition. Each side component is weighted as indicated.

The frequency spectrum of all class 2 superpositions is zero at the band edge with greater and greater spectral density at the low frequency end for increasing numbers of superpositions. There are no phase reversals as with class 1 superpositions.

Another useful class of superpositions I designate class 3. Class 3 superpositions are similar to class 2 superpositions in that the impulse-response components are weighted and unequal. However, both positive and negative components are permitted. The components fall off in magnitude in linear fashion, but there is no symmetry along the time axis.

Figure 14A:
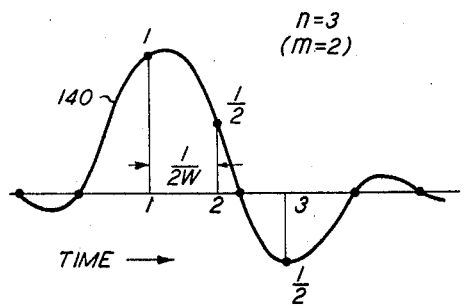
FIGS. 14a and 14b are respectively the time and frequency domain responses of asymmetrically weighted impulse superpositions extending over three symbol intervals.

FIG. 14a shows the envelope in curve 140 for the case of $n=3$. The components are reduced by integral multiples of the smallest weighting. The components are also alternately negative and positive after the main and first side component. The channel shaping characteristic shown in FIG. 14b rises to a peak at $1/2W$ cycles per second and then falls to zero at W cycles per second. The impulse response is similar to that found in unequalized channels. Five sampling levels are required, but the maximum spacing between samples is now two levels—twice as great as for the corresponding class 2 superposition.

Figure 15:
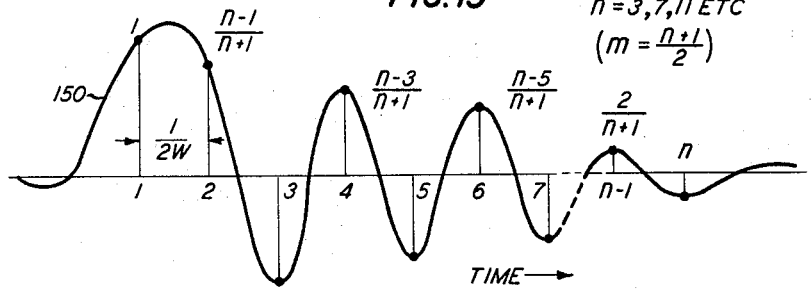
FIG. 15 is the time-domain response of asymmetrically weighted impulse superpositions extending over $n$ symbol intervals.

FIG. 15 is the envelope for the general class 3 superposition as represented by curve 150. The weights assigned each superposition are shown on the curve.

Still further superpositions with useful properties can be devised. The two further classes of superposition result from a band-pass type of filtering, rather than the low-pass type of the first three classes. The spectral distribution for the latter two classes is symmetrical with tapering responses at both band edges of the channel. Therefore, no direct-current component is present and the superposed wave can be transmitted at baseband without resorting to modulation.

A useful superposition designated class 4 is shown in FIG. 23a for $n=3$ in which two $(\sin x)/x$ components 230 and 232 of opposite polarity are spaced at two symbol intervals, i.e., $1/W$ cycles per second. The corresponding spectral shaping for the channel as shown in FIG. 23b is that of a sine wave 235 symmetrical about the frequency $1/2W$. It is apparent that there is neither a direct-current component nor a component at the upper band limit. At point 231 there may be considered to be a zero-weighted component. The number of levels to be interpreted in the received wave is only three. The envelope of the time domain response is shown by broken line 233.

A class 5 superposition is shown in FIG. 24a. Here symmetrical weighted superpositions are made at a spacing of $1/W$ cycles per second. The main component 241 is weighted at unity and the two side components 240 and 242 are weighted negatively at one-half the main component to yield the envelope 243, indicated by the broken line. The number of effective components is five counting the zero components at points 244 and 246. The number of levels to be examined at the receiver is five also. The channel shaping required to effect the class 5 superposition is that of a raised cosine 245 as shown in FIG. 24b. A class 5 superposition likewise has neither a direct-current component nor a component at the high end of the channel bandwidth.

Both the sine and raised cosine channel shapings are readily attainable by conventional filter design techniques. Reference may be made in this connection to H. W. Bode U.S. Patent No. 2,029,014 issued Jan. 28, 1936. FIG. 6 of Bode shows low-pass filter characteristics and FIG. 11, bandpass filter characteristics obtainable with ladder networks described therein.

The received multilevel signal resulting from any of the classes of superposition described above can be detected according to simple logic rules. The three-level binary wave resulting from class 1 superpositions is shown in FIG. 2c. Slicing levels 1 and 2, dividing the received wave into three zones, are shown in the figure. The outer zones are interpreted unconditionally as 1 or 0 as indicated. The inner zone is conditionally 1 or 0, according to the state of the preceding bit. Samples are taken at the instants marked by the ticks below the wave.

Figure 17:
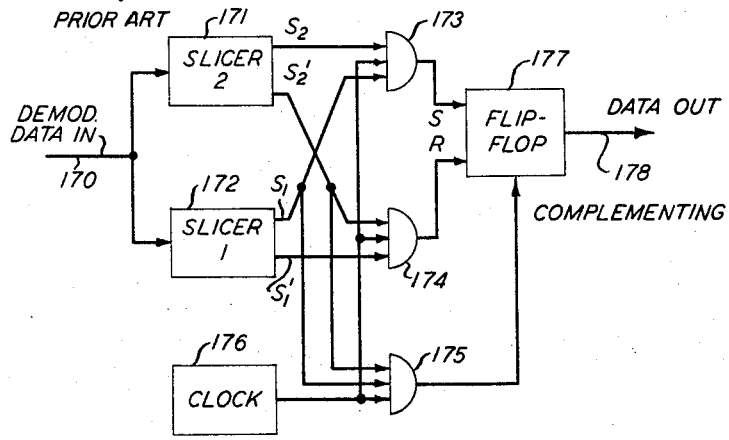
FIG. 17 is a block diagram of a prior art three-level decoder for signals having a conditional binary interpretation operating on logic principles.

FIG. 17 is an illustrative embodiment of a slicing and logic circuit for interpreting the binary significance of the three-level wave of FIG. 2c. The incoming wave after demodulation to baseband is applied on line 170 to two slicing circuits 171 and 172. These may advantageously be of the two-state Schmitt trigger type with threshold levels established as shown on the waveform. Complementary outputs appear on the slicer output leads $S_1$, $S_1'$, $S_2$ and $S_2'$ according to whether the sample taken exceeds or falls below the threshold of the particular slicer in a well known way. A clock source 176 synchronized with the transmitting clock in any conventional manner supplies pulses at the correct sampling instants.

The outputs of slicers 171 and 172 and clock 176 are applied to three coincidence or AND gates 173, 174 and 175. The clock signal is connected in common to all three gates. Gate 173 is opened on the coincidence of a clock pulse and above-the-threshold outputs $S_1$ and $S_2$ from slicers 171 and 172. Gate 173 therefore closes for a sample taken in the uppermost zone of the received wave. Gate 174 is opened on the coincidence of a clock pulse and below-the-threshold outputs $S_1'$ and $S_2'$. Gate 174 therefore opens for a sample taken in the lowermost zone of the received wave. Gate 175 is opened on the coincidence of a clock pulse, an above-the threshold output $S_1$ from slicer 172 and a below-the-threshold output $S_2'$ from slicer 171. Gate 175 therefore opens for a sample taken in the middle conditional zone of the received wave.

The final element of FIG. 17 is flip-flop or bistable multivibrator circuit 177. The output of gate 173 controls the set input of flip-flop 177; output of gate 174, the reset input; and output of gate 175, the complementing input. The output of flip-flop 177 is therefore a 1 for a sample in the upper zone, a 0 for a sample in the lower zone and the complement of the previous sample for a sample in the middle zone. Clearly, for a series of samples in the middle zone, a dotting (alternate 1's and 0's) pattern results. Flip-flop 177 therefore provides memory over two sampling instants. The circuit of FIG. 17 is the logical equivalent of Clokey's synchronous vibrating relay circuit.

Received signals having more than three detectable levels can be implemented by extension of the principle of FIG. 17 by providing a slicer between adjacent levels, a shift register advanced by the clock to store prior detected samples in an obvious manner, and logical AND and OR gates to combine present and past samples.

The fact that in all partial-response systems according to my invention each received sample is generated by known superpositions of input symbols makes possible a detection circuit of general application to all classes of superposition. Let the coefficients $k_1, k_2, \ldots k_n$ be defined as the relative weights in integers applied to successive superposed components of class 1 through class 5 systems. In the class 2, $n=3$ superposition of FIG. 11a, $k_1=1$, $k_2=2$ and $k_3=1$. Similarly for the class 3, $n=3$ superposition of FIG. 14a, $k_1=2$, $k_2=1$ and $k_3=-1$. For the class 4, $n=3$ superposition of FIG. 23a, $k_1=1$, $k_2=0$ and $k_3=-1$. For the class 5, $n=5$ superposition of FIG. 24a, $k_1=-1$, $k_2=0$, $k_3=2$, $k_4=0$ and $k_5=-1$. For a class 1 system all $k$'s equal unity.

Figure 20:
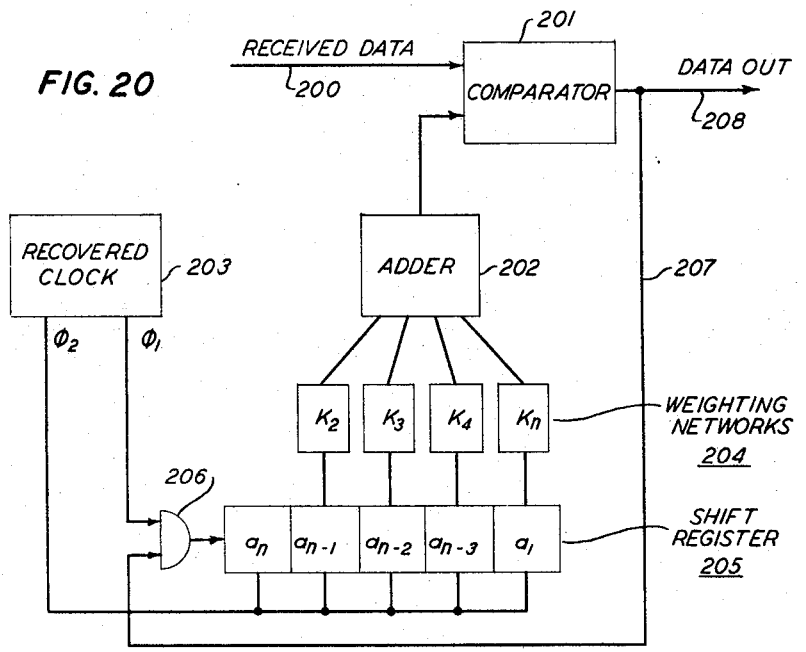
FIG. 20 is a block diagram of a generalized multilevel decoder according to this invention.

FIG. 20 is an illustrative embodiment of a detector of general application to multilevel detection. The detector comprises a comparator 201, a clock source 203, a linear adder 202, a plurality of weighting networks 204 and a shift register 205. Comparator 201 compares the level of the signals on its two input points and produces a 1 output if a signal on the first input exceeds the signal on its other input and a 0 otherwise. The comparator can be a differential amplifier of well known type. Clock source 203 delivers output pulses at a first phase $\phi_1$ and a second phase $\phi_2$ in synchronism with the transmitter clock.

The synchronization can be accomplished in any conventional manner as from signal transitions. Adder 202 is a conventional summation circuit, such as an operational amplifier. Weighting networks 204 are multiplier circuits using potentiometers, for example, and inverters as necessary for class 3, 4 and 5 superpositions. The weights assigned are in accordance with the weighting of the superpositions at the transmitter and are assumed to be known in advance. For class 1 superpositions, of course, the weighting networks can be omitted or set to unity. Shift register 205 is conventional and can comprise a chain of bistable multivibrators. The $a_n$ designations indicate present, past, past past and so forth symbols at a given sampling instant.

Recovered data on line 200 is compared in comparator 201 with the output of adder 202, which is the summation of the weighted estimates of the $n-1$ preceding symbols. The output of comparator 201 on lead 208 is the output of the detector. This output is also fed through coincidence gate 206 in synchronism with the $\phi_1$ output of clock source 203 to the left-hand stage of shift register 205. Shortly thereafter the $\phi_2$ output of clock source 203 advances the contents of all stages of the shift register one place to the right. Multipliers 204 operate on all the stored $n-1$ symbols and a sum is produced in adder 202 accordingly. This sum is then compared with the next arriving signal component and a new output choice of symbol is made. This process continues as long as data continues to be received.

Comparator 201 is essentially a variable threshold slicing circuit, the threshold being provided by the output of adder 202.

In the detector of FIG. 20 all slicing functions are performed in the single comparator 201. The storage function is performed in shift register 203. A detector for a superposition having five components is shown in FIG. 20. Weighting networks and shift register stages may be added or omitted in accordance with the number of components in the superposition being considered. The logic of the detector is that if the present signal level equals the weighted sum of the contributions of the previous $n-1$ detected bits, then the present symbol is 0; if the present signal level exceeds the weighted sum of the contributions of the previous $n-1$ detected bits by more than half the largest $k$ value, the present symbol is 1. This rule applies for unipolar signals. For bipolar signals, however, a positive difference between the present signal and the sum of the contributions of past bits indicates a 1; a negative difference, a 0. In the general case, only the uppermost and lowermost levels have an unconditional interpretation. All intermediate levels are conditional on the past history of the received signal.

The detection circuit can be considerably simplified by precoding of the original data at the transmitter to make the interpretation of all levels unconditional. Even levels then have an unconditional 0 interpretation; and odd levels, an unconditional 1 interpretation. To accomplish precoding for class 1 superpositions the original binary sequence $a_1 a_2 a_3 \ldots a_n$ is transformed into a new binary sequence $b_1 b_2 b_3 \ldots b_n$ by modulo-two addition such that $$b_n = a_n \oplus b_{n-1} \oplus b_{n-2} \ldots \oplus b_1 \qquad (1)$$

The symbol $\oplus$ indicates modulo-two addition. The channel transformation to the $c_n$ sequence is then equivalent to the algebraic addition of the present and $n-1$ preceding bits of the sequence $b_n$. Thus, $$c_n = b_n + b_{n-1} + b_{n-2} \ldots + b_1 \qquad (2)$$

and $c_n$ can have $n+1$ possible values, including 0.

From Equation 1 it is apparent that $$a_n = b_n \oplus b_{n-1} \oplus b_{n-2} \ldots \oplus b_1 \qquad (3)$$

For $a_n = 1$, Equation 3 indicates the $b_n$ sequence is of odd parity. Similarly, for $a_n = 0$, the $b_n$ sequence is of even parity. From a comparison of Equations 2 and 3, the corresponding $c_n$ is an odd number for $a_n = 1$ and even for $a_n = 0$. Therefore, all sampling levels have unconditional significance without reference to prior samples.

Equation 1 can be implemented by means of a shift register whose contents ($b_n$ sequence) are combined with the input data signal ($a_n$ sequence) to be precoded in an EXCLUSIVE-OR gate, whose output in turn feeds the first stage of the shift register. Equation 2 is implemented by applying the $b_n$ train to the appropriately shaped transmission channel.

Figure 18:
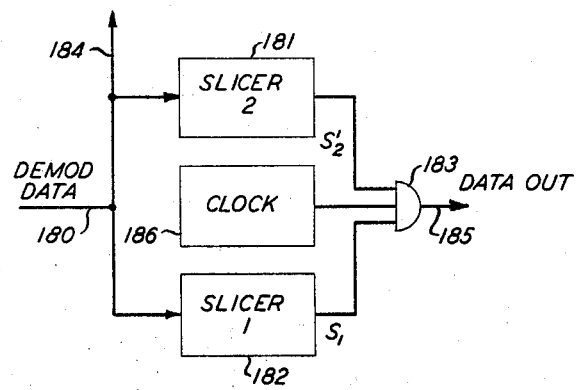
FIG. 18 is a block diagram of a three-level decoder for signals having an unconditional binary interpretation.

The circuit of FIG. 17 can be adapted, with the omission of flip-flop 177 and two of the coincidence gates, to the detection of such precoded signals occupying three levels. Such an adaptation is shown in FIG. 18. Incoming demodulated data at baseband on lead 180 is applied as before to a pair of slicers 181 and 182. These slicers are appropriately biased for threshold levels as indicated by the dashed lines on FIG. 3c. The $S_2$ "zero" output of upper slicer 181 and the $S_1$ "one" output of lower slicer 182 are combined in AND gate 183 with a clock signal from clock source 186 to produce a "one" data output on lead 185. The detection circuit is considerably simplified, since the channel memory function has been transferred to the transmitter.

The circuit of FIG. 18 can be expanded readily to detect signals having more levels, for example five and seven levels, by adding additional slicers in pairs with inputs taken from lead 184. The threshold levels are established accordingly. The 0 and 1 slicer outputs are combined in the same fashion as above in a further AND gate similar to gate 183, also enabled by signals from clock source 186. The outputs of the several AND gates are passed to output lead 185 through a buffer gate (not shown) in a well known manner.

Similar precoding techniques for transformation of an $a_n$ sequence to a $b_n$ sequence have been devised for the other classes of transformation. In the general case, Equation 3 becomes by modulo-two addition $$a_n = k_1 b_n \oplus k_2 b_{n-1} \oplus k_3 b_{n-2} \ldots \oplus k_n b_1 \qquad (4)$$

Coefficients $k_1 \ldots k_n$ are integral values proportional to the weights assigned to the several superpositions appropriate to its class. The corresponding channel characteristic (compare with Equation 2) becomes by algebraic addition $$c_n = k_1 b_n + k_2 b_{n-1} + k_3 b_{n-2} \ldots + k b_1 \qquad (5)$$

The same interpretation of the received wave $c_n$ values applies as in the general case. Odd $c_n$ terms indicate a 1 binary data symbol, and even $c_n$ terms indicate a 0 binary data symbol. All terms in Equation 5 with even coefficients no longer have significance relative to the oddness or evenness of the resultant binary interpretation.

For the two cases of greatest practical interest among class 2 and 3 superpositions, that is, where $n=3$, which produce a five-level transformed signal, precoding is simplified. For the class 2 transformation, substitute $n=3$, $k_1=1$, $k_2=2$, $k_3=1$ in Equation 4 and obtain $$a_3 = b_3 \oplus 2b_2 \oplus b_1 \qquad (6)$$

Since $2b_2$ is always even, $a_3$ depends only on the first and third terms on the right of Equation 6. Thus, $$a_3 = b_3 \oplus b_1 \qquad (7)$$

From Equation 7

$$b_3 = a_3 \oplus b_1 \qquad (8)$$

Similarly for the class 3 transformation, substitute $n=3$, $k_1=2$, $k_2=1$, $k_3=-1$ in Equation 4 and obtain $$a_3 = 2b_3 \oplus b_2 + (-b_1) \qquad (9)$$
$$= b_2 \oplus b_1 \qquad (10)$$

Equations 9 and 10 are clearly equivalent. Transforming as for Equation 8, $$b_2 = a_3 \oplus b_1 \qquad (11)$$

Figure 21:
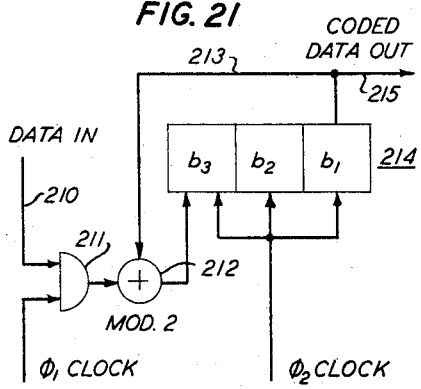
FIG. 21 is a block diagram of a multilevel precoder according to this invention for a symmetrically weighted superposition of impulse responses extending over three symbol intervals.

Equation 8 can be implemented as shown in FIG. 21.

Binary data to be precoded is admitted on line 210 to coincidence gate 211, which is enabled by an early clock pulse $\phi_1$ as shown. A three-stage shift register 214, having stages $b_3$, $b_2$ and $b_1$, advances from left to right under the control of a late clock pulse $\phi_2$. Stored in register 214 are the past $b_2$ and past-past $b_1$ transformed pulses. The contents of stage $b_1$ are applied over lead 213 to adder 212 and added modulo-two fashion therein to the present data bit and the result entered in stage $b_3$. An exclusive-OR gate performs modulo-two addition. The output of stage $b_1$ on lead 215 is the transformed $b_n$ sequence. This sequence is in turn applied to the transmission channel to obtain the appropriate precoded multilevel $c_n$ sequence. The five levels in the $c_n$ sequence now have unconditional binary interpretation and can be detected in a circuit as described in connection with FIG. 18.

Figure 22:
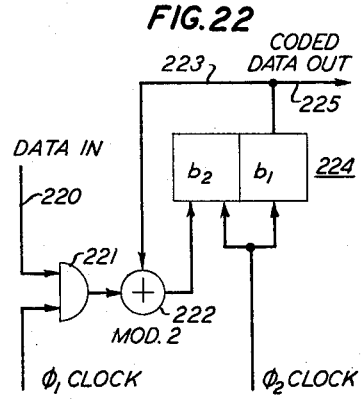
FIG. 22 is a block diagram of a multilevel precoder according to this invention for an asymmetrically weighted superposition of impulse responses extending over three symbol intervals.

In a similar fashion Equation 11 can be implemented as shown in FIG. 22. The principle is the same, but one shift register stage is omitted. Binary data on line 220 is applied to coincidence gate 221 under the timing control of early clock pulse $\phi_1$. Two-stage shift register 224, having only stages $b_2$ and $b_1$, advances from left to right under the control of late clock pulse $\phi_2$. Only past-past transformed bit $b_1$ is stored in register 224. The contents of stage $b_1$ are applied over lead 223 to adder 222 and added modulo-two fashion therein to the present data bit and the result entered in stage $b_2$. The output of stage $b_1$ on lead 225 is again the transformed $b_n$ sequence, which becomes the multilevel $c_n$ sequence when applied to the properly shaped channels. The $c_n$ sequence can be also decoded bit-by-bit in a circuit of the type shown in FIG. 18.

Class 4 and 5 superpositions are also subject to precoding for unconditional detection adaptability. For the class 4 transformation shown in FIG. 23a, substitute $n=3$, $k_1=1$, $k_2=0$, $k_3=-1$ in Equation 4 and obtain $$a_3 = b_3 \oplus (-b_1) = b_3 \oplus b_1 \quad (12)$$

whence $$b_3 = a_3 \oplus b_1 \quad (13)$$

Equation 13 is seen to be identical to Equation 8 for the class 2, $n=3$ transformation. Therefore, the same precoder of FIG. 21 can be used for class 4, $n=3$ precoding. The channel shaping is, of course, different.

For the class 5 transformation shown in FIG. 24a, substitute $n=3$, $k_1=-1$, $k_2=0$, $k_3=2$, $k_4=0$, $k_5=-1$ in Equation 4 and obtain $$a_5 = -b_5 \oplus 2b_3 \oplus (-b_1) = b_5 \oplus b_1 \quad (14)$$

whence $$b_5 = a_5 \oplus b_1 \quad (15)$$

A precoder for the class 5 transformation is obvious from a study of FIGS. 21 and 22. The implementation is substantially the same as that of FIG. 21 except for the inclusion of a five-stage shift register, instead of a three-stage register.

The relative performance of the several systems can be compared using the ideal rectangular channel spectrum as a reference. The noise bandwidth power of the perfectly equalized channel (physically unrealizable) is the area under the rectangular frequency response curve (dashed curve 71 in FIG. 7) W cycles per second in width and unity height or W watts.

For the equal-amplitude class 1 case and $n=2$ (three decoding levels), the equivalent noise power from the quarter-cosine curve 70 of FIG. 7 normalized to W watts reduces the adjacent sampling levels to $\pi/4$ or 0.7854 instead of unity. This is a 2.1-decibel penalty, but signaling at the rate of 2W bits per second is realizable. For larger values of $n$, the loss in performance rises gradually, assuming the channel shaping function is optimally distributed between transmitter and receiver. This same result applies as well to the class 4, $n=3$ transformation, which involves the bandpass version of the same transmission function.

For the symmetrically weighted class 2 case and $n=3$ (five decoding levels), the raised cosine curve of FIG. 11b normalized to W watts of noise power reduces the received signal amplitude spacing to one half. This is a six-decibel penalty, assuming decoding one bit at a time. This result applies as well to the class 5, $n=5$ transformation, which is the corresponding bandpass version. The penalty increases further for larger values of $n$.

Figure 14B:
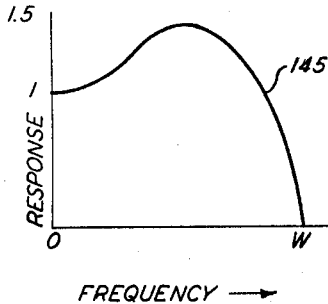

For the asymmetrically weighted class 3 case, $n=3$ (five decoding levels), the complex curve of FIG. 14b yields a factor of 0.88 to normalize the area under the curve and maintain the same W watts of noise power. Without precoding, the distance between sampling levels is 0.88 for a loss of only 1.2 decibels. Precoding, unfortunately, doubles the noise penalty to 7.2 decibels by eliminating the advantage of $k_1=2$, which caused two-level jumps in the received signal. With precoding, the receiving detector must discriminate between adjacent levels.

The partial-response concept of this invention permits a substantial tolerance in binary transmission beyond the classical Nyquist limiting signaling rate of 2W bits per second. This comes about from the rather gradual increase in intersymbol interference as the rate is increased due to the rather well behaved impulse responses used. However, the absolute intersymbol interference remains relatively fixed as the number of sampling levels is increased. The tolerance to changes in bit rate and sampling precision, therefore, diminishes rapidly for all classes of superposition as more components are used. Computer simulation shows the following tolerances exceeding the theoretical maximum signaling rate:

| Superposition | Possible Maximum Rate | Tolerance, Percent | Signal/Noise Penalty (db) |
|---|---|---|---|
| Single $(\sin x)x$ (Nyquist) | 2W | 0 | 0 |
| Class 1: | | | |
|   Two equal weight | 1.43×2W | 43 | 2.1 |
|   Four equal weight | 1.10×2W | 10 | 4.5 |
|   Six equal weight | 1.018×2W | 1.8 | 6.1 |
| Class 2: | | | |
|   Three triangular weight | 1.40×2W | 40 | 6.0 |
|   Seven triangular weight | 1.146×2W | 14.6 | 12.0 |
| Class 3: Three asymmetrical weight | 1.38×2W | 38 | {[1] 1.2 / [2] 7.2} |
| Class 4: Two equal weight asymmetrical | 1.15×2W | 15 | 2.1 |
| Class 5: Five asymmetrical weight bipolar | 1.08×2W | 8 | 6.0 |

[1] Without precoding.
[2] With precoding.

While this invention has been disclosed by way of specific illustrative embodiments, it will be understood that such disclosed embodiments are not to be considered as limiting. A wide range of modification by those skilled in the art is possible without departing from the spirit and scope of the appended claims.

What is claimed is:
1. A system for transmitting binary data communication signals over a band-limited channel at rates comparable to twice the bandwidth of said channel comprising
    a binary data signal source,
    a transmitting terminal, and
    a receiving terminal,
    filter means divided between said transmitting and receiving terminals evoking from said channel $n$ overlapping responses to each binary signal of one form applied thereto from said signal source,
    the signal on said channel having a plurality of significant detection levels, and
    means at said receiving terminal for comparing the present sampled level of the signal on said channel with the algebraic sum of the previous $n-1$ signals and designating the present sample as a binary signal of one form if the present level equals the sum of the previous $n-1$ signals and as a binary signal of opposite form if the present level exceeds the sum of the previous $n-1$ signals.

2. A system for transmitting binary data communication signals over a band-limited transmission channel at rates comparable to twice the bandwidth of said channel comprising a binary data signal source,
a transmitting terminal, and
a receiving terminal,
filter means at said transmitting terminal evoking from said channel $n$ overlapping responses to binary signals of one form applied thereto from said signal source,
the signal on said channel having a plurality of significant detection levels, and
means at said receiving terminal for comparing the present sampled level of the signal on said channel with the algebraic sum of the previous $n-1$ signals and designating the present sample as a binary signal of one form if the present level equals the sum of the previous $n-1$ signals and as a binary signal of opposite form if the present level exceeds the sum of the previous $n-1$ signals.

3. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals applied thereto to spread the energy in each data signal over a plurality of signal intervals into a multilevel signal,
said shaping means effectively reconstituting the impulse response to each individual data signal into a plurality of symmetrically weighted overlapping superpositions at the signaling interval, the envelope of said superpositions being generally triangular, and
means in said receiving terminal for converting said multilevel signal back into binary form.

4. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals applied thereto to spread the energy in each data signal over a plurality of signal intervals into a multilevel signal,
said shaping means effectively reconstituting the impulse response to each individual data signal into a plurality of asymmetrically weighted overlapping superpositions at the signal interval, including positive and negative components linearly decaying in amplitude, and
means in said receiving terminal for converting said multilevel signal back into binary form.

5. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals applied thereto to spread the energy in each data signal over a plurality of signal intervals into a multilevel signal,
said shaping means effectively reconstituting the impulse response to each individual data signal into a pair of equal amplitude, but oppositely poled, superpositions spaced by twice the signal interval, and
means in said receiving terminal for converting said multilevel signal back into binary form.

6. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals supplied thereto to spread the energy in each data signal over a plurality of signal intervals into a multilevel signal,
said shaping means effectively reconstituting the impulse response to each individual data signal into three symmetrically weighted overlapping superpositions including one central positive component and two side negative components of one-half the weight of the central component, all separated by twice the signal interval, and
means in said receiving terminal for converting said multilevel signal back into binary form.

7. A system for doubling the transmission rate of a binary data signal over a band-limited transmission channel comprising a transmitting terminal at one end of said channel,
means divided between said transmitting and receiving terminals for shaping the impulse response of said channel to binary data signals applied thereto to spread the energy in each data signal over a plurality of signal intervals into a multilevel signal, and
means in said receiving terminal for converting said multilevel signal back into binary form comprising
a variable-threshold comparator,
a first input to said comparator for the received multilevel signal,
a multistage storage circuit for retaining a memory of a past plurality of detected binary signals,
a synchronizing clock source for advancing said storage circuit at each signal interval,
an adder for taking the algebraic sum of the quantities stored in said storage circuit,
a second input to said comparator accepting the sum produced by said adder, said sum constituting the threshold level for said comparator, and
an output for said comparator connected to said storage circuit and serving as an output for said system, said output being in one state when the multilevel signal on said one input exceeds the sum signal on said second input and in the opposite state otherwise.

8. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals applied thereto to spread the energy in each data signal over a plurality of signal intervals into a multilevel signal, said shaping means reducing the frequency response of said transmitting channel from a maximum at the low-frequency band edge to zero at the high-frequency cut-off thereof proportional to unity increased by the cosine of an angle in the range of zero to one-hundred-eighty degrees, the equivalent response to a single impulse being the superposition of three impulses delayed by a signal interval relative to each other, one main impulse having unity relative amplitude and each side impulse having one-half the amplitude of the main impulse, and
means in said receiving terminal for converting said multilevel signal back into binary form.

9. A system for doubling the transmission rate of a binary data signal over a band-limited transmission channel comprising a transmitting terminal at one end of said channel,
a receiving terminal at the other end of said channel,
means divided between said transmitting and receiving terminals for shaping the impulse response of said channel to binary data signals applied thereto to spread the energy in each data signal over a plurality of signal intervals into a multilevel signal, said shaping means altering the frequency response of said transmitting channel from unity relative amplitude at the low-frequency band edge to three-halves relative amplitude at the mid-frequency of the transmission band to zero at the high-frequency band edge, the equivalent impulse response to a single impulse being the superposition of a main pulse of unity relative amplitude and two following impulses at successive signaling interals of relative amplitude plus and minus one-half relative amplitude respectively, and means in said receiving terminal for converting said multilevel signal back into binary form.

10. A system for doubling the transmission rate of a binary data signal over a band-limited transmission channel comprising a transmitting terminal at one end of said channel, a receiving terminal at the other end of said channel, means divided between said transmitting and receiving terminals for shaping the impulse response of said channel to binary data signals applied thereto to spread the energy in each data signal over a plurality of signal intervals into a multilevel signal, said shaping means transforming the frequency response of said transmitting channel from a maximum at a mid-frequency thereof to zero at the low-frequency and high-frequency cut-offs thereof proportional to the sine of an angle in the range of zero to one-hundred-eighty degrees, the equivalent response to a single impulse being the superposition of two impulses delayed by a double signal interval relative to each other, said two impulses being of equal amplitude but opposite polarity, and means in said receiving terminal for converting said multilevel signal back into binary form.

11. A system for doubling the transmission rate of a binary data signal over a band-limited transmission channel comprising a transmitting terminal at one end of said channel, a receiving terminal at the other end of said channel, means divided between said transmitting and receiving terminals for shaping the impulse response of said channel to binary data signals applied thereto to spread the energy in each data signal over a plurality of signal intervals into a multilevel signal, said shaping means transforming the frequency response of said transmitting channel from a maximum at the mid-frequency thereof to zero at the low-frequency and high-frequency cut-offs thereof proportional to unity increased by the cosine of an angle in the range of minus one-hundred-eighty degrees to plus one-hundred-eighty degrees, the equivalent response to a single impulse being the superposition of three impulses delayed by a double signal interval relative to each other, said three impulses being a main positive component of unity positive amplitude and two side components of one-half negative amplitude preceding and following said main component, and means in said receiving terminal for converting said multilevel signal back into binary form.

12. A detector for a multilevel data signal whose outer levels have unconditional binary significance of either form and whose intermediate levels are conditionally of one binary form or the other according to the previously detected form comprising a variable-threshold slicing circuit, the output of said slicing circuit having binary significance of one form for an input data signal exceeding its threshold and of the opposite form for an input data signal equaling or falling below its threshold, means for applying a multilevel data signal to an input of said slicing circuit, storage means for successive outputs from said slicing circuit up to the number of levels in a multilevel data signal, adder means for summing the detected outputs in said storage means for the previous signal intervals one less than the number of levels in a multilevel data signal, means for applying the output of said adder means to an input of said slicing circuit to establish a threshold therefor, and clock means for admitting outputs from said slicing circuit to said storage means at signaling intervals and for advancing the contents of said storage means at the end of each signaling interval.

13. A detector for a multilevel data signal formed from the effective superposition of weighted and delayed overlapping impulse responses and having unconditional binary significance of either form for its outer levels and conditional binary significance for its inner levels according to the previously detected forms comprising a variable-threshold slicing circuit, the output of said slicing circuit having binary significance of one form for a multilever data signal applied to one of its inputs and exceeding a threshold established at another of its inputs and of the opposite form otherwise, means for applying a multilevel data signal to an input of said slicing circuit, storage means for successive outputs of said slicing circuit up to the number of levels in a multilevel data signal, weighting means for multiplying the several outputs stored in said storage means by factors proportional to the weights assigned to the effective superpositions in the multilevel data signal, adder means for summing the weighted successive outputs from said storage means for the previous signal intervals one less than the number of levels in the multilevel data signal, means for applying the output of said adder means to an input of said slicing circuit to establish a threshold therefor, and clock means for admitting outputs from said slicing circuit to said storage means at signaling intervals and for advancing the contents of said storage means at the end of each signaling interval.

14. A system for precoding a binary data signal into a multilevel signal for transmission over a channel of restricted bandwidth having an impulse response equivalent to the symmetrical superposition of three delayed single impulses spaced by a signaling interval for each binary signal of one form comprising a three-stage shift register, the third stage of said shift register serving as the output for said system, a clock source having an output at each signaling interval connected to shift the contents of said shift register one stage at the end of each signaling interval, modulo-two summing means connected to the first stage of said shift register, means connecting the third stage of said shift register to said summing means, and a coincidence gate under the control of said clock source for admitting the binary data signal to said summing means.

15. A system for precoding a binary data signal into a multilevel signal for transmission over a channel of restricted bandwidth having an impulse response equivalent to the asymmetrical superposition of three delayed stingle impulses spaced by a signaling interval for each binary signal of one form weighted in the ratios two, one and minus one comprising a two-stage shift register, the second stage of said shift register serving as the output of said system, a clock source having an output at each signaling interval connected to shift the contents of said shift register by one stage at the end of each signaling interval, modulo-two summing means connected to the first stage of said shift register, means connecting the second stage of said shift register to said summing means, and a coincidence gate under the control of said clock source for admitting the binary data signal to said summing means.

16. In combination with a transmitting terminal, a transmission channel of restricted bandwidth W cycles per second in width, and a receiving terminal, means for transmitting binary data signals over said channel at the signaling rate of at least 2W symbols per second comprising means divided between said transmitting and receiving terminals for shaping the transmission characteristic of said channel such that the impulse response to a single data impulse applied to said transmitting terminal is equivalent to the superposition of a plurality of time-spaced delayed impulses to form a multilevel signal at said receiving terminal, and means at said receiving terminal for converting said multilevel signal back to binary form, said converting means including a comparator for determining whether each successive sample of said multilevel signal is greater or less than the algebraic sum of a plurality of previous detected samples equal to one less than the number of equivalent superpositions per data impulse.

References Cited

UNITED STATES PATENTS

| | | |
|---|---|---|
| 3,337,863 | 8/1967 | Lender. |
| 3,162,724 | 12/1964 | Ringelhaan _____ 325—38 X |
| 3,238,299 | 3/1966 | Lender _____ 325—38 X |

ROBERT L. GRIFFIN, *Primary Examiner.*

JOHN W. CALDWELL, *Examiner.*

J. T. STRATMAN, *Assistant Examiner.*